United States Patent
Smith

(10) Patent No.: US 8,966,900 B2
(45) Date of Patent: Mar. 3, 2015

(54) METHODS AND SYSTEMS TO HARVEST ENERGY FROM THE EARTH

(75) Inventor: David R. Smith, Midland, TX (US)

(73) Assignee: David Randolph Smith, Midland, TX (US)

(*) Notice: Subject to any disclaimer, the term of this patent is extended or adjusted under 35 U.S.C. 154(b) by 130 days.

(21) Appl. No.: 13/422,820

(22) Filed: Mar. 16, 2012

(65) Prior Publication Data

US 2012/0234005 A1 Sep. 20, 2012

Related U.S. Application Data

(60) Provisional application No. 61/453,699, filed on Mar. 17, 2011.

(51) Int. Cl.
*F03G 7/00* (2006.01)
*F02G 1/04* (2006.01)
*F03G 7/04* (2006.01)
*F02G 1/043* (2006.01)

(52) U.S. Cl.
CPC . *F03G 7/04* (2013.01); *F02G 1/043* (2013.01); *Y02E 10/10* (2013.01)
USPC .............................. 60/641.2; 60/517; 60/526

(58) Field of Classification Search
CPC ............. F03G 7/04; F03G 7/06; Y02E 10/10; F02G 1/04; F02G 1/043
USPC .............................. 60/641.2–641.5, 516–526, 60/641.1–641.5; 166/57, 272.1, 272.7; 165/45
See application file for complete search history.

(56) References Cited

U.S. PATENT DOCUMENTS

| | | | | |
|---|---|---|---|---|
| 3,058,730 A * | 10/1962 | Bays | | 299/4 |
| 5,465,702 A * | 11/1995 | Ferrenberg | | 123/543 |
| 5,755,100 A | 5/1998 | Lamos | | |
| 6,192,683 B1 * | 2/2001 | Stock | | 60/527 |
| 6,672,063 B1 * | 1/2004 | Proeschel | | 60/616 |
| 7,067,933 B2 * | 6/2006 | Bassett | | 290/2 |
| 7,178,337 B2 * | 2/2007 | Pflanz | | 60/641.2 |
| 7,472,548 B2 * | 1/2009 | Meksvanh et al. | | 60/641.2 |
| 2008/0223032 A1 | 9/2008 | Sumrall | | |
| 2010/0223924 A1 * | 9/2010 | Cargill | | 60/641.2 |
| 2013/0056171 A1 * | 3/2013 | Klemencic | | 165/45 |

OTHER PUBLICATIONS

International Search Report and Writetn Opinion issued in PCT/US2012/029493 dated Jun. 22, 2012, 12 pages.
International Preliminary Report on Patentability mailed Sep. 26, 2013, during Examination of International Application No. PCT/US2012/029493.

* cited by examiner

*Primary Examiner* — Thomas Denion
*Assistant Examiner* — Laert Dounis
(74) *Attorney, Agent, or Firm* — Fulbright & Jaworski LLP

(57) ABSTRACT

The present disclosure provides an engine assembly that is installed below the surface of the earth to harvest the thermal energy of the earth, using a working fluid in a closed loop system, and convert it into electricity, which can be commercialized at the surface. The subterranean engine comprises a hot region and a cold region, and a working fluid that moves between the two regions. The movement and efficiency of the working fluid operates the pistons that drive a generator coupled to the pistons, thereby generating electricity. The hot region of the engine is primarily powered by the geothermal energy. The engine can further incorporate renewable energy to improve the movement of the working fluid between the hot and cold regions. The system can further be used to store renewable energy below ground.

27 Claims, 5 Drawing Sheets

METHODS AND SYSTEMS TO HARVEST ENERGY FROM THE EARTH

CROSS REFERENCE

The present application claims the benefit of U.S. Provisional Patent Application No. 61/453,699, filed Mar. 17, 2011 and entitled "METHOD AND APPARATUS TO SUBDUE ENERGY FROM THE EARTH," the disclosure of which is incorporated by reference herein in its entirety.

TECHNICAL FIELD

The present disclosure is directed to methods and apparatus to harvest thermal energy from the earth, and more particularly to using one or more well bores to collect energy from the subterranean environment of the earth and convert it into electrical power.

BACKGROUND

Technological advancements in all fields, such as agriculture, manufacturing transportion, communication, require energy. To date, mankind has relied heavily on coal, hydrocarbon, and nuclear materials to generate energy and power for these advancements.

These conventional methods of generating electricity have deleterious effects. For instance, burning of coal and hydrocarbon release toxic and greenhouse gases into the environment. In addition, mining and collection of the coal and hydrocarbon greatly damage the environment, as well as require other natural resources, such as water, in the operation. While nuclear energy does not produce these deleterious effects, it is not without shortcomings. Nuclear energy produces nuclear wastes, which can be significantly dangerous if released due to human error or natural disasters. Further, due to the potential harm caused by the nuclear wastes, nuclear plants are often located in an isolated area, which can pose a challenge for distribution of the electricity.

Current methods to harvest geothermal energy address some of the issues of other conventional methods of generating energy. However, current methods of harvesting geothermal energy also have disadvantages. For instance, they often require injecting water into the earth to absorb the thermal energy and recover the heated water to surface to collect that energy. This often leaches significant amounts of minerals and other toxic substances from the subterranean environment during the energy collection operations. As such, there is still a need for methods and apparatuses that generate clean and renewable energy without consuming other natural resources or posing significant risks of releasing harmful material into the environment during a disaster.

BRIEF SUMMARY OF THE DISCLOSURE

According to one aspect of the present disclosure, there is provided a method for extracting geothermal energy comprising the steps of: providing a heat intake region below the earth's surface; providing a heat exhaust region located at a distance away from said heat intake region, providing fluid communication between said heat intake region and heat exhaust region; moving a working fluid between said heat intake region and said heat exhaust region, wherein said movement is at least in response to a temperature difference between said heat intake region and said heat exhaust region; moving a piston system coupled to a generator in response to at least said movement of the working fluid to generate electricity.

In one embodiment, the providing a heat intake region step comprises the steps of: providing a horizontal section of a well bore; and disposing a horizontal piston system in said horizontal section, said horizontal piston system is configured to move in the horizontal direction relative to the earth's surface. In another embodiment, the providing a heat exhaust region step comprises the steps of: providing a vertical section of a well bore; and disposing a vertical piston system in said vertical section, said vertical piston system is configured to move in the vertical direction relative to the earth's surface.

In one embodiment, the moving a piston system step comprises the steps of: coupling said horizontal piston system to said vertical piston system; and coupling said horizontal and vertical piston systems to a generator, wherein movement of said horizontal and vertical piston systems operate the generator to generate electricity.

In another embodiment, the providing fluid communication step comprises the steps of providing at least one deviated well bore above said heat intake region; and providing at least one connecting well bore between said at least one deviated well bore and said heat intake region to provide fluid communication between said at least one deviated well bore and said heat intake region. Alternatively, the providing fluid communication step comprises: providing at least one deviated well bore fluidly coupled above said; and hydraulically fracturing said at least one deviated well bore and said heat intake region to provide fluid communication between said at least one deviated well bore and said heat intake region.

In one embodiment, the moving a working fluid step comprises: heating of the working fluid at the heat intake region; transferring of at least a portion of the heated working fluid from the heat intake region through said at least one connecting well bore; transferring of at least a portion of the heated working fluid from said at least one connecting well bore to said deviated well bore; transferring of at least a portion of the heated working fluid from said deviated well bore to said heat exhaust region; cooling of at least a portion of the heated working fluid in the heat exhaust region, wherein at least a portion of said cooled working fluid acts to push the vertical piston system downward; and returning at least a portion of the cooled working fluid to the heat intake region. In another embodiment, the cooling step comprises: moving at least a portion of the heated working fluid through a heat exchange system to remove thermal energy from the heated working fluid. Alternatively, the cooling step comprises moving at least a portion of the heated working fluid through a regenerator configured to provide a larger surface area of heat transfer.

In one embodiment, the method further comprises the step of enhancing the temperature difference between the heat intake region and the heat exhaust region. In one embodiment, the enhancing step comprises: providing additional heating of the working fluid at the heat intake region, wherein the additional heating is powered by a renewable energy source. Alternatively, the enhancing step comprises: providing additional cooling of the working fluid at the heat exhaust region, wherein the additional cooling is powered by a renewable energy source. In one embodiment, the renewable energy source is selected from the group consisting of wind, solar, geothermal, and any combination thereof. In another embodiment, the working fluid is selected from the group consisting of helium, hydrogen, nitrogen, air, and any combination thereof.

According to another aspect of the present disclosure, there is provided an engine extracting geothermal energy comprising: a heat intake region comprising a horizontal piston system located below the earth's surface, said horizontal piston system is configured to move in the horizontal direction relative to the earth's surface; a heat exhaust region comprising a vertical piston system located away from said horizontal piston system, said vertical piston system is configured to move in the vertical direction relative to the earth's surface; wherein said horizontal piston system is coupled to said vertical piston system and wherein said horizontal piston system is in fluid communication with said vertical piston system; a generator coupled to said vertical piston system, wherein movement of the vertical piston system is configured to operate the generator to generate electricity; and a working fluid configured to move between the horizontal piston system and the vertical piston system, wherein the movement of the working fluid effects movement of the vertical piston system.

In one embodiment, the fluid communication between said horizontal piston system and said vertical piston system comprises: at least one deviated well bore in fluid communication with said vertical piston system; and at least one connecting well bore configured to provide fluid communication between said horizontal piston system and said at least one deviated well bore.

In another embodiment, the engine further comprises: a heat exchange system coupled to the vertical piston system, wherein said heat exchange system is configured to remove thermal energy from said working fluid. In one embodiment, the heat exchange system comprises a heat tube heat exchanger system. In one embodiment, the heat tube heat exchanger system comprises: a first tube located in a second tube, wherein said first tube has a smaller outer diameter than the inner diameter of said second tube; a heat exchange working fluid located in the annulus between said first tube and said second tube; and a heat exhaust member coupled to the top of said second tube.

In one embodiment, the engine further comprises a regenerator configured to receive the working fluid and provide a larger surface area of heat transfer. In one embodiment, the regenerator is the earth. In another embodiment, the regenerator is a porous media. In another embodiment, the regenerator is a sintered filter like device. In yet another embodiment, the regenerator is a flame arrestor flow restrictor type device.

In one embodiment, the engine further comprises: at least one heater near the horizontal piston system to increase the temperature of the working fluid, said at least one heater is powered by a renewable energy source. In another embodiment, the engine further comprises at least one refrigeration unit near the vertical piston system to decrease the temperature of the working fluid, said at least one refrigeration unit is powered by a renewable energy source. In one embodiment, the renewable energy source is selected from the group consisting of wind, solar, geothermal, and any combination thereof. In another embodiment, the working fluid is selected from the group consisting of helium, hydrogen, nitrogen, air, and any combination thereof.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the embodiments illustrated in greater detail in the accompanying drawings, wherein.

Figure 1:
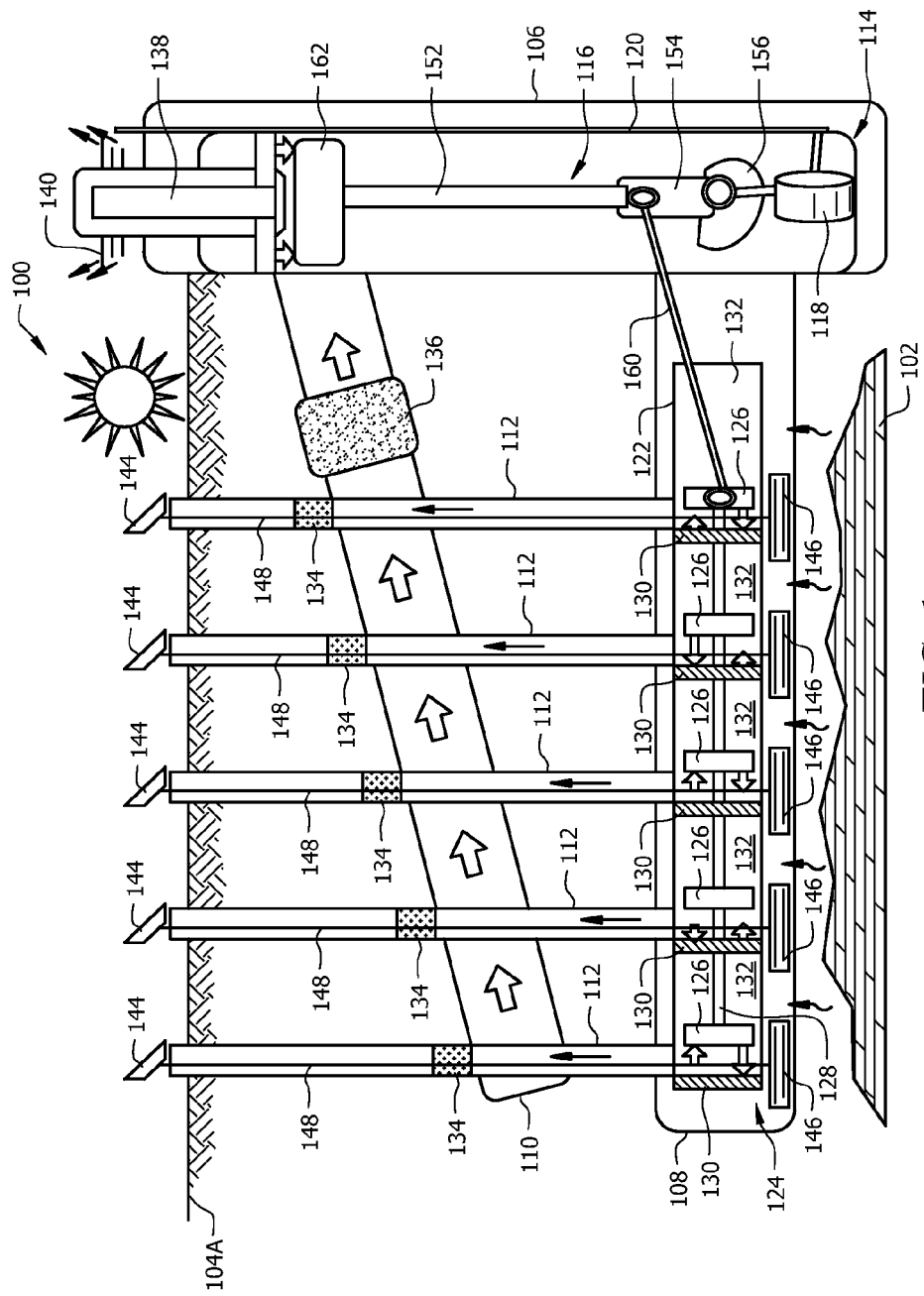
FIG. 1 is an illustration of the expansion phase of an exemplary embodiment of an energy collection system according to the aspects of the present disclosure installed in the subterranean.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

As used herein, "a" or "an" means one or more. Unless otherwise indicated, the singular contains the plural and the plural contains the singular. As described herein, the term "surface" can be the surface of the earth or surface of a body of water and includes locations at or above the surface of earth. The term "subterranean" includes locations below the surface of the earth. As used herein, geothermal energy encompasses any energy located below the surface of the earth. Also the term "heat engine" or "engine" encompasses any form of device that transforms heat energy into thermodynamic work.

The present disclosure provides an engine assembly that is installed below the surface of the earth to harvest the geothermal energy of the earth by using a working fluid in a closed loop system, and convert it into electricity. The subterranean engine comprises a hot region or a heat intake region, a cold region or a heat exhaust region, and a working fluid that moves between the two regions. The movement of the working fluid operates the pistons that drives a generator that is coupled to the pistons, thereby generating electricity. The hot region of the engine is primarily powered by the geothermal energy. The engine assembly can further incorporate other renewable resources, such as solar and wind power, that power heaters or refrigeration units to assist in the thermodynamic movement of the working fluid by increasing or decreasing the temperature of the working fluid near the hot or cold region, respectively.

According to one aspect of the present disclosure, the engine assembly comprises a primary vertical well bore, two or more vertical connecting well bores, a horizontal well bore located at or near the geothermal energy source, and a deviated well bore fluidly coupled to the vertical well bore and the vertical connecting well bores, which are fluidly coupled to the horizontal well bore. The horizontal well bore is preferably located at a depth that is sufficient to extract geothermal energy. This depth varies depending on various factors, including geography, energy needs, and operating conditions. For example, to supply the energy for a standard home, the heat engine extraction depth may be only about 500 feet. On the other hand, greater energy needs may require large engine assemblies or a plurality of engine assemblies located at about 15,000 feet. This depth calculation, as mentioned, is also dependent on the subterranean features of the particular location and the operating conditions.

In the exemplary engine assembly, the primary vertical well bore has a cylinder disposed therein, which contains a vertical piston system coupled to a generator. The horizontal well bore contains a cylinder with a horizontal pistons system having a plurality of horizontal pistons coupled to one another disposed therein. Both piston systems are connected to a common counter weight, thereby coupling the movements of both piston systems together. The horizontal piston system is located in the heat intake region of the engine assembly while the vertical piston system is located in the heat exhaust region of the engine assembly. The vertical connecting well bores connect the horizontal well bore to the deviated well bore so the thermodynamic cycle can be completed.

The geothermal energy heats the working fluid in the horizontal well bore. The heated working fluid expands and rises to move away from the hot region. The engine assembly directs the movement of heated working fluid toward the heat exhaust region where the vertical piston is located. The heated working fluid rises through the vertical connecting well bores and into the deviated well bore toward the vertical piston system. The movement of the heated fluid pushes the vertical piston upward.

The working fluid enters the vertical piston system and pushes it downward. The working fluid is then cooled either through loss of thermal energy to the surrounding environment and/or assisted by the engine system, such as through a heat exchange system, regenerator, or refrigeration unit. As the working fluid cools, it travels back to the geothermal energy source to be heated again and moved through thermal cycle of the engine assembly. The vertical piston moves upward as the working fluid exits the vertical piston system. The cooled working fluid can return to the geothermal energy source through the vertical connecting well bores and/or through hydraulic fractures. The movement of the working fluid drives the horizontal and vertical piston systems, which rotate the generator to generate electricity, which can be stored or distributed immediately, below or at the surface. Accordingly, the methods and systems of the present disclosure transforms geothermal energy into thermodynamic work, and uses said work to generate electrical power.

Figure 2:
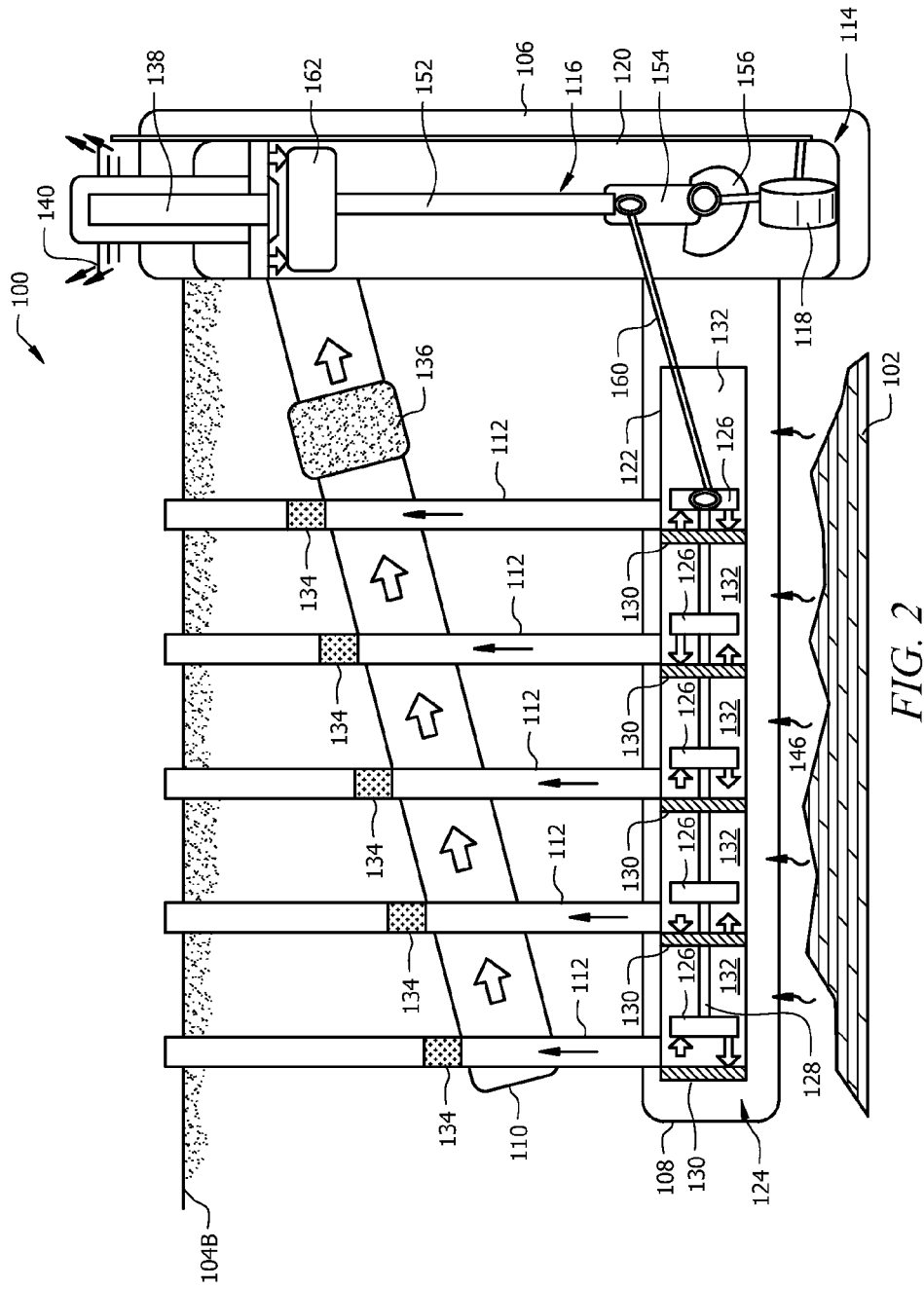
FIG. 2 is an illustration of the expansion phase of another exemplary embodiment of an energy collection system according to the aspects of the present disclosure installed below the sea floor.
Figure 3:
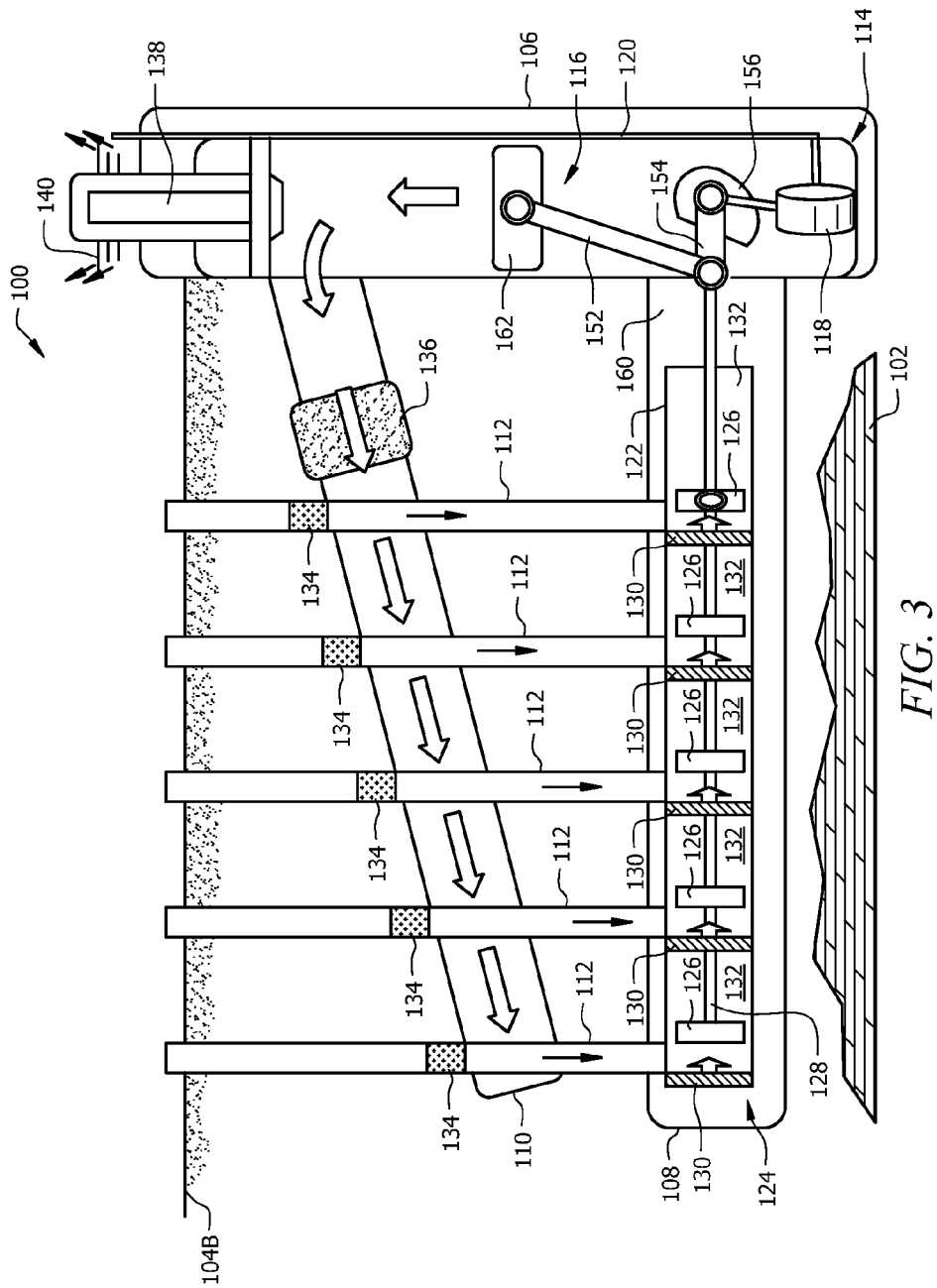
FIG. 3 is an illustration of the transfer phase of the exemplary embodiment of an energy collection system according to the aspects of the present disclosure installed below the sea floor.
Figure 4:
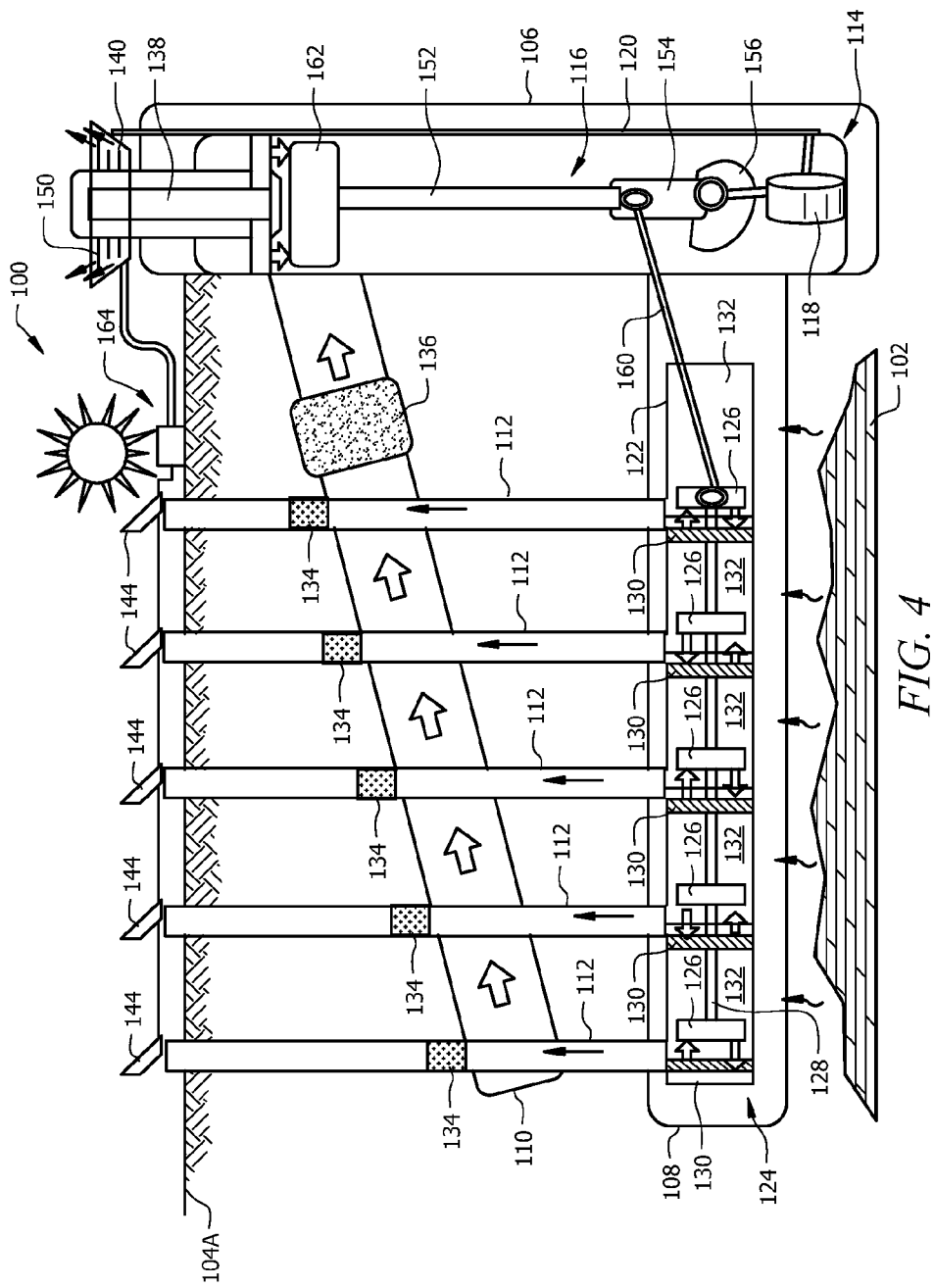
FIG. 4 is an illustration of an exemplary embodiment of an energy collection system according to the aspects of the present disclosure using solar power to augment the cooling process in the energy collection system.
Figure 5:
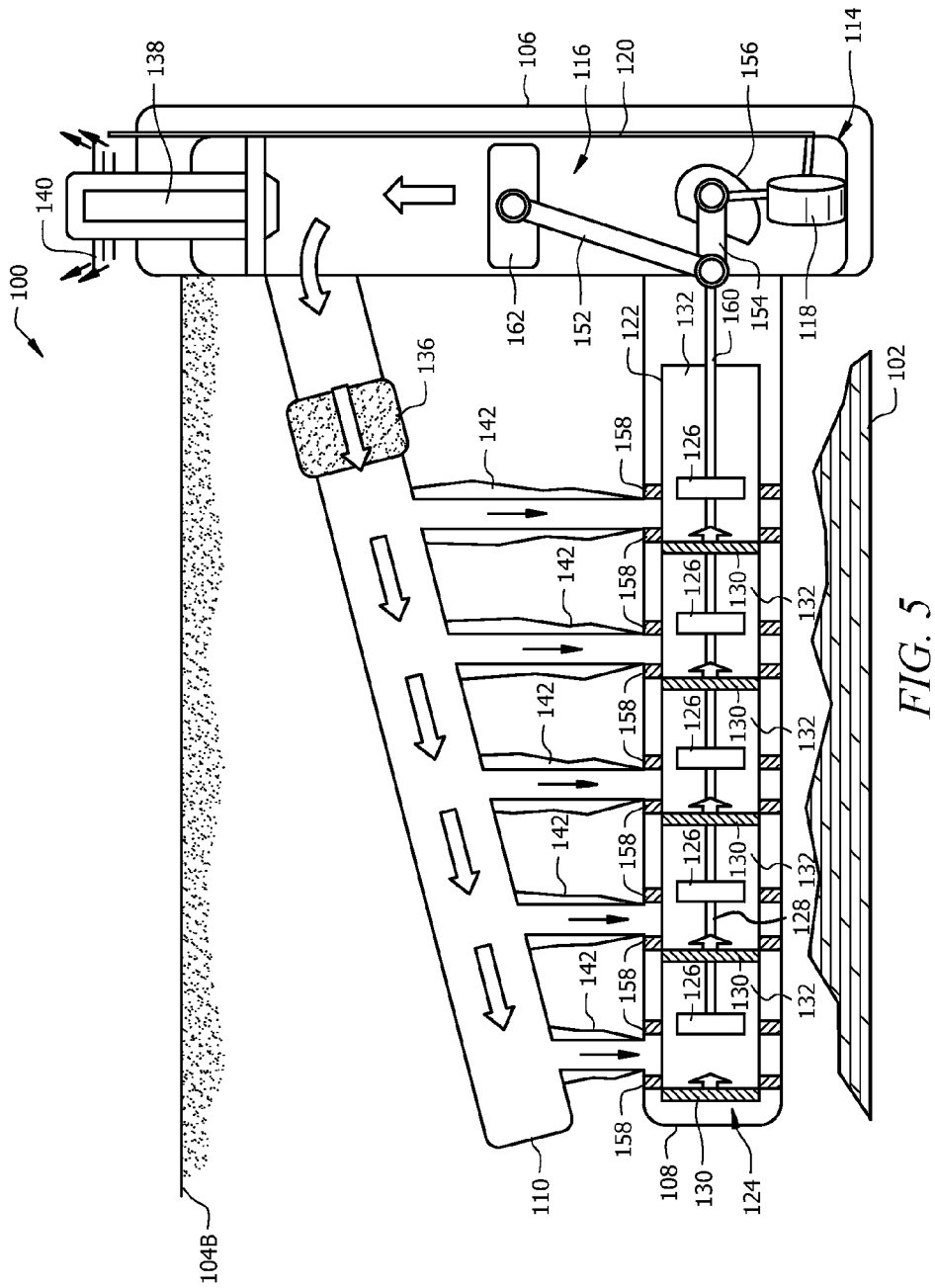
FIG. 5 is an illustration of an exemplary embodiment of an energy collection system.

FIGS. 1-5 illustrate various specific embodiments of the engine systems of the present disclosure, which are meant to be exemplary and not limiting. Reference is made to FIGS. 1-5, which show engine assembly or system 100, which can be used to harvest geothermal energy from subterranean region 102 and surrounding subterranean earth strata. In FIGS. 1 and 4, engine system 100 is installed below surface 104A of the earth. In FIGS. 2, 3, and 5, engine system 100 is installed below sea floor 104B.

Referring to FIGS. 1-5, engine assembly 100 includes primary vertical well bore 106, horizontal well bore 108, deviated well bore 110, and one or more vertical connecting well bores 112. While the descriptions separately refer to vertical well bore 106 and horizontal well bore 108, it is understood that these well bores are preferably part of the same well bore. That is, vertical well bore 106 is the vertical section and horizontal well bore 108 is the horizontal section of a single well bore. The figures are intended to illustrate an exemplary configuration of a subterranean engine assembly for harvesting geothermal according to the aspects of the present disclosure. It is understood by one of ordinary skill in the art that horizontal sections connected to vertical well bores can include a deviated section located between the horizontal and vertical section, also known as kick off or deviated section.

Primary vertical well bore 106 includes vertical cylinder 114 disposed inside vertical well bore 106. Inside vertical cylinder 114 is vertical piston system 116 comprising vertical piston 162, proximal segment 152, and distal segment 154. Vertical piston system 116 is configured for vertical (up and down) movements of vertical piston 162. Vertical piston system 116 is coupled to generator 118, which is coupled to electrical wire 120. Electricity generated by generator 118 travels through electrical wire 120, which is electrically coupled to generator 118, to the surface to be stored, used, or further distributed as desired.

The working fluid of engine assembly 100 is confined in vertical cylinder 114 to the area above vertical piston 162. Vertical cylinder 114 is fluidly connected to deviated wellbore 110, vertical well bores 112, and horizontal cylinder 122, thereby allowing the working fluid to move between horizontal well bore 108 and the top region of vertical well bore 106. Referring to FIGS. 1-5, movements of the working fluid is demonstrated by the arrows in horizontal well bore 108, connecting well bores 112, deviated well bore 110, and vertical well bore 106. Horizontal well bore 108 includes horizontal cylinder 122, which confines the working fluid of engine system 100 and prevents it from escaping into the environment. Horizontal cylinder 122 houses horizontal piston system 124, which moves in the horizontal direction. Horizontal piston system 124 is coupled to vertical piston system 116 through connecting rod 160. As shown, horizontal piston system is coupled to distal segment 154 of vertical piston system 116. The movements of both horizontal piston system 124 and vertical piston system 116 rotate generator 118 to generate electricity.

Referring to FIGS. 1-5, proximal segment 152 is attached to vertical piston 162 at the end closer to surface 104*a* and is coupled to distal segment 154 at the other end. Horizontal piston system 124 is preferably coupled to vertical piston system 116 at the junction where proximal segment 152 is coupled to distal segment 154 through connecting rod 160. Distal segment 154 is further coupled to counterweight 156, which maintains vertical piston system 116 in an upward position, where vertical piston 162 is near the top of cylinder 114, as shown in FIGS. 1, 2, and 4.

In the preferred embodiment, there is one horizontal piston 126 and chamber 132 for every vertical connecting well 112 to accommodate the working fluid transmitted between horizontal cylinder 122 through connecting well bores 112 and deviated well bore 110 and to the top of vertical cylinder 122 above vertical piston 162. Horizontal pistons 126 are connected to one another to form horizontal piston system 124. In one embodiment, as shown, horizontal pistons 126 are coupled to common segment 128. Each horizontal piston 126 is segregated from the other through seals 130, thereby creating individual chambers 132 for each vertical connecting well bores 112. Horizontal well bore 108 is located at or near the geothermal energy source 102, either through being located at a certain depth and/or particular location. Accordingly, horizontal well bore 108 can be considered the "hot" end or region, e.g., the heat intake, of engine system 100 while vertical well bore 106 can be considered the "cold" end or region, e.g., the heat exhaust, of engine system 100. In certain embodiments, engine assembly 100 can comprise more than one horizontal well bore 108 and more than one vertical well bore 106 connected to one another. In another embodiment, horizontal cylinder 122 can be over one mile long, where there are many individual chambers 132 fluidly connected to corresponding vertical connecting well bores 112, which are connected to deviated well bore 110 that is of similar length to horizontal cylinder 112, e.g., over one mile.

Vertical connecting well bores 112 fluidly couples chambers 132 to deviated well bore 110. Each vertical connecting well bore 112 is plugged with plug 134 to keep the working fluid of engine assembly 100 from escaping into the environment. FIGS. 1, 2, and 4 show the expansion phase of engine assembly 100 where the working fluid in horizontal well bore 108 is heated and vertical piston system 116 is in an upward position. FIGS. 3 and 5 show the transfer phase of engine assembly 100 where the working fluid returns to chambers 132.

Referring to FIGS. 1, 2, and 4, as the working fluid in each chamber 132 is heated, it expands and seeks to rise through vertical connecting well bores 112 and into deviated well bore 110. As the working fluid moves into deviated well bore 110 and into the chamber above vertical piston 162 in vertical cylinder 114, it pushes vertical piston 162 downward against the weight of counterweight 156. This piston movement also pushes horizontal pistons 126 away from vertical piston system 116. Once the working fluid cools down, it moves out of the chamber above vertical piston 162 in cylinder 112, thereby removing the force pushing against counterweight 156. As counterweight 156 returns to its default position, piston 116 moves back to its upward position, and vertical piston 162 pushes the condensed working fluid back into horizontal well bore 108, as shown in FIGS. 3 and 5.

Referring to FIGS. 1-5, the heat exchange process between heated and condensed working fluid can be further enhanced with the use of regenerator 136 and/or heat exchange system 138. In one embodiment, regenerator 136 can enhance the efficiency of the heat exchange process by providing a larger surface area of heat transfer. In another embodiment, regenerator 136 is selected from the group: one or more subterranean strata of the earth, a porous media such as at least a section of a well bore filled with sand, a sintered filter like device such as a tube filled with sintered brass beads, a flame arrestor flow restrictor type device, and any combination thereof. In the preferred embodiment, regenerator 136 is located in the upper part of deviated well bore 110, between the connecting well bore 112 closest to vertical piston system 116 and vertical piston 162 to assist in exchanging of heat of the working fluid of the heat engine.

In one embodiment, heat exchange system 138 includes any type of heat exchanger known in the art by those of ordinary skill. One such example, which is meant to be exemplary and not limiting, is an ammonia heat exchange tube. Heat exchange system 138 can further include vents 140 to further assist with the heat exchange process. In a preferred embodiment, heat exchange system 138 comprises a tube heat exchanger that has an inner tube filled with a separate working fluid. The working fluid of engine 100 enters the outer tube and transfers thermal energy to the working fluid of heat exchange system 138, thereby heating up the working fluid of heat exchange system 138, which rises through the inner concentric tube of said heat tube heat exchanger. The working fluid of engine 100 is continually cooled by the working fluid of heat exchange system 138 rising and transferring the thermal energy to the surrounding earth and the surface of the earth, particularly through vents 140.

Referring to FIGS. 3 and 5, as the working fluid cools, it travels back to chambers 132 in horizontal cylinder 122, thereby pushing horizontal pistons 126 toward vertical piston system 116. Referring to FIG. 3, the working fluid can return to the horizontal cylinder 122 through vertical connecting well bores 112. Referring to FIG. 5, Alternatively, or in addition, the working fluid can return to horizontal cylinder 122 through hydraulic fractures 142, which can be provided for in a number of ways known to those familiar with oil and gas well completions. In one embodiment, hydraulic fractures 142 are created by perforating the casings of horizontal well bore 108 and deviated well bore 110 at various positions along their laterals lengths and hydraulically connecting the two well bores 108 and 110 using hydraulic fracturing means. Once horizontal well bore 108 and deviated well bore 110 are hydraulically fractured and connected with means known to those in the oil and gas industry, for example with high pressure fluids transporting propants, the fracture hydraulic paths can be used to transport the working fluid between vertical piston system 116 and horizontal piston system 124. In an alternative embodiment, hydraulic fractures can also serve as regenerators for engine system 100. The movement of the working fluid back to horizontal cylinder 122 allows vertical piston 162 to move upward, thereby returning vertical piston system 116 to the expansion phase position in FIGS. 1, 2, and 4. The cycle begins over again with the heating of the working fluid in horizontal well bore 108.

Referring to FIGS. 1 and 4, engine system 100 can further incorporate other renewable energy sources, such as solar panels or solar collectors 144. Referring to FIG. 1, engine system 100 includes one or more heaters 146 powered by solar panels 144 through electrical wires 148 to increase the temperature at the hot region of engine system 100. In the preferred embodiment, heaters 146 are located in horizontal well 108 near horizontal cylinder 122 to provide the optimum benefit of heating the working fluid. Referring to FIG. 4, engine system 100 includes refrigeration unit 150 powered by solar panels 144 through electrical system 164 to reduce the temperature at the cold region of engine system 100. In the preferred embodiment, refrigeration unit 150 is coupled to heat exchange system 138 to provide the optimum benefit of cooling the working fluid. It is understood that engine system 100 can include both heaters 146 and refrigeration unit 150. In another embodiment, instead of or in addition to solar collectors 144, engine system 100 can include wind collectors (not shown) to power heaters 146 near the hot end of engine assembly 100 or refrigeration unit 150 near the cold end of engine assembly 100. In yet another embodiment, engine system 100 can use the energy produced by engine system 100 itself to power additional heating and/or cooling units, such as heaters 146 and refrigeration units 150. This is a useful means of storing energy when consumer demand from engine assembly 100 is low or renewable energy, such as wind or solar, is high.

While FIGS. 1-5 show engine system 100 with one deviated well bore 110, it is understood that other embodiments can include more than one deviated well bore 110. One exemplary description of engine system 100 is a Sterling cycle engine. In one embodiment, the working fluid of engine system 100 includes working fluids known in the art to work with Sterling cycle engines, which includes gases such as helium, hydrogen, nitrogen, air, other suitable gases such as certain inert gases. Use of these gases by the engine systems of the present disclosure has the benefit of not compromising the subterranean environment or polluting any potential surface environments or potable water sources.

Vast arrays or farms of engine systems 100 according to the aspects of the present disclosure can be employed to generate large electrical base loads for electrical grids. Alternatively, the present disclosure provides means of deploying the embodiments of the present disclosure individually around the world to generate electricity at a plurality of locations. The embodiments of the present disclosure allow for power generation in isolated areas on the earth that is not connected to any large electrical grid. The embodiments of the present disclosure allows for, but does not require, electricity generation below the surface, which is transmitted to the surface for further distribution and commercialization. The embodiments of the present disclosure also allows for use or storage of additional renewable energy, such as wind and solar, in the harvesting of geothermal energy.

Engine system 100 can be constructed by methods and means well known in the art of well bore construction, particularly to those in the oil and gas industry. The following description provides an exemplary way of installing and constructing engine system 100, which is not intended to be limiting. Vertical well bore 106, connecting well bores 112, and horizontal well bore 108 are drilled by a drilling rig (not shown). In a location with surface portable water zones, a large surface well bore is drilled to cover any surface potable water zones, and then a casing is run to a depth to cover said potable water zones and the casing is then grouted into place. Once the surface casing is set the casing shoe is drilled out with a smaller bit and the well bore is extended to the total required depth where engine system 100 is to be located. As mentioned before, this depth is different in different areas of the world, and the depth is also influenced by the amount of energy that needs to be extracted from the earth, and the local geothermal gradients.

After vertical well bore 106 is drilled, it is kicked off its vertical trajectory to make a horizontal trajectory known has a horizontal lateral to those familiar with the art of well drilling. The horizontal lateral is at the depth required for the hot end of the heat engine. The horizontal well bore is drilled with a bit size to accommodate the insertion of the heat engines horizontal piston system. For example, horizontal well bore 108 of the preferred embodiment has a 17.5" hole drilled and a 13⅜" OD casing disposed in horizontal well bore 108 and grouted in place with cement. The 13⅜" casing is preferably run from the toe of horizontal well bore 108 until the heal of horizontal well bore 108 or close thereto. Then an acoustical or magnetic device is placed in the 13⅜" casing to transmit signals through the earth to a directional drilling sensor device used in the drilling string of deviated well bore 110. The drilling rig then kicks off a new section of bore above horizontal well bore 108. The directional drilling sensing device used to guide the drill bit of the directional drilling equipment is well known to those in the art of directional drilling to drill deviated well bore 110.

Methods to drill one horizontal well bore above or below another is well known to those familiar with drilling Steam Assisted Gravity Drainage, SAGD. Once deviated well bore 110 drilled, a casing is run in the bore and cemented in a similar manner as that of horizontal well bore 108. Deviated well bore 110 can be substantially horizontal or is angled upward toward the surface of the earth as shown by FIGS. 1-5. The angle of deviated well bore 110 is determined by various factors, including the subterranean conditions, including geographical features and geothermal energy availability, as well as energy needs and operating conditions.

Horizontal well bore 108 and deviated well bore 110 are then fluidly connected, either through drilling of one or more connecting well bores 112 that run from horizontal well bore 108 to deviated well bore 110 using means known to those skilled in the art of drilling or by means of creating hydraulic fractures, such as that described above. Connecting well bores 112 preferably contain casing cemented in place to maintain the working fluid in engine system 100, and they are preferably plugged with plugs 134 to maintain the closed loop system for the working fluid in engine system 100. Once horizontal well bore 108 and deviated well bore 110 are connected hydraulically through the earth using any of the above means or others, the lowering of horizontal piston system 124 into horizontal well bore is preferably performed. This is performed by building the multi-piston cylinder for the heat intake region on the surface with pistons 126 and seals 130 predisposed on and in horizontal cylinder 122. In one embodiment, cylinder 122 is lowered into horizontal well bore 108 from the surface through vertical well bore 106 using a drilling rig, continuous rod deployment unit, or as continuous coiled tubing units known to those skilled in the art.

Referring to FIG. 5, once horizontal cylinder 122 with predisposed horizontal pistons 126 is in place in horizontal well bore 108, inflatable packers 158 that are located on the outer diameter of horizontal cylinder 122 are inflated to form an elastomeric seal of the annulus between the 13⅜" casing of horizontal well bore 108 and horizontal cylinder 122. Alternatively, swellable packer elements or metal seals can be used in place of inflatable packers 158.

Connection rod 160, along with distal segment 154 of vertical piston 162, proximal segment 152, distal segment 154, counterweight 156, generator 116, and the required electrical components (e.g. electrical cable 120) attached, can be deployed in vertical well bore 106. Proximal segment 152 and vertical piston 162 are then lowered and coupled to distal segment 154. Connecting rod 160 is then coupled to horizontal piston system 124. Vertical well bore 106 can then be capped off with heat exchange system 138.

Engine system 100 preferably includes a tubing (not shown) with its distal end coupled to the top of vertical piston 162 and its proximal end at the surface of the earth. Once engine system 100 is in place and closed, the working fluid is then injected into the subterranean heat engine from surface through this tubing. The amount of working fluid depends the operating conditions of the particular engine system 100, such as volume of the system, temperature or pressure. The amount can be determined by one of ordinary skill in the art. The tubing connection between the surface and the top of vertical piston 162 allows the working fluid to be added initially, and replaced from time to time. All of these attached mechanisms, electrical submersible cable, along with various down hole monitoring systems, such as pressure, and temperature gauges, of the heat engine can be sequentially attached as discussed above and deployed from surface into horizontal well bore 108 through vertical well bore 106 that is connected thereto using connection and deployment means well known to those in the oil and gas industry drilling and completion industry, such as a rig. With engine system 100 in place and capped to form a closed loop system and the working fluid injected, the thermodynamic cycle described above can begin with heating of the working fluid in horizontal well bore 108.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for extracting geothermal energy comprising the steps of:
   disposing a vertical piston system in a vertical section of a well bore having a heat exhaust region, said vertical piston system configured to move in the vertical direction relative to the earth's surface;
   disposing a plurality of horizontal pistons in a heat intake region of a horizontal well bore, said horizontal pistons configured to move in the horizontal direction relative to the earth's surface, wherein each horizontal piston defines a separate chamber in the heat intake region;
   providing fluid communication between said heat intake region and heat exhaust region;
   moving a working fluid between said heat intake region and said heat exhaust region, wherein said movement is at least in response to a temperature difference between said heat intake region and said heat exhaust region;
   coupling the vertical piston system to a generator to generate electricity in response to at least said movement of the working fluid.

2. The method of claim 1 further comprising
   coupling said plurality of horizontal pistons to said vertical piston system.

3. The method of claim 1 wherein the providing fluid communication step comprises:
   providing at least one deviated well bore above said heat intake region; and
   providing at least one connecting well bore between said at least one deviated well bore and said chambers.

4. The method of claim 1 wherein the providing fluid communication step comprises
   providing at least one deviated well bore above said heat intake region; and
   hydraulically fracturing between said at least one deviated well bore and said chambers.

5. The method of claim 3 wherein said moving a working fluid step comprises:
   heating of the working fluid at the heat intake region;
   transferring of at least a portion of the heated working fluid from the heat intake region through said at least one connecting well bore;
   transferring of at least a portion of the heated working fluid from said at least one connecting well bore to said deviated well bore;
   transferring of at least a portion of the heated working fluid from said deviated well bore to said heat exhaust region;
   cooling of at least a portion of the heated working fluid in the heat exhaust region, wherein at least a portion of said cooled working fluid acts to push the vertical piston system downward; and
   returning at least a portion of the cooled working fluid to the heat intake region.

6. The method of claim 5 wherein the cooling step comprises:
   moving at least a portion of the heated working fluid through a heat exchange system to remove thermal energy from the heated working fluid.

7. The method of claim 5 wherein the cooling step comprises moving at least a portion of the heated working fluid through a regenerator configured to provide a larger surface area of heat transfer.

8. The method of claim 1 further comprising the step of enhancing the temperature difference between the heat intake region and the heat exhaust region.

9. The method of claim 8 wherein the enhancing step comprises:
   providing additional heating of the working fluid at the heat intake region, wherein the additional heating is powered by a renewable energy source.

10. The method of claim 8 wherein the enhancing step comprises:
    providing additional cooling of the working fluid at the heat exhaust region, wherein the additional cooling is powered by a renewable energy source.

11. The method of claim 9 wherein the renewable energy source is selected from the group consisting of wind, solar, geothermal, and any combination thereof.

12. The method of claim 10 wherein the renewable energy source is selected from the group consisting of wind, solar, geothermal, and any combination thereof.

13. The method of claim 1 wherein the working fluid is selected from the group consisting of helium, hydrogen, nitrogen, air, and any combination thereof.

14. An engine extracting geothermal energy comprising:
    a heat intake region comprising a horizontal piston system located below the earth's surface, said horizontal piston system comprising a plurality of horizontal pistons and configured to move in the horizontal direction relative to the earth's surface;
    a heat exhaust region comprising a vertical piston system located away from said horizontal piston system, said vertical piston system configured to move in the vertical direction relative to the earth's surface;
    wherein said horizontal piston system is coupled to said vertical piston system and wherein said horizontal piston system is in fluid communication with said vertical piston system through at least one deviated well bore and a plurality of vertical connecting well bores;
    a generator coupled to said vertical piston system, wherein movement of the vertical piston system is configured to operate the generator to generate electricity; and a working fluid configured to move between the horizontal piston system and the vertical piston system, wherein the movement of the working fluid effects movement of the vertical piston system.

15. The engine of claim 14 further comprising:
a heat exchange system coupled to the vertical piston system, wherein said heat exchange system is configured to remove thermal energy from said working fluid.

16. The engine of claim 15 wherein said heat exchange system comprises a heat tube heat exchanger system.

17. The engine of claim 16 wherein the heat tube heat exchanger system comprises:
a first tube located in a second tube, wherein said first tube has a smaller outer diameter than the inner diameter of said second tube;
a heat exchange working fluid located in the annulus between said first tube and said second tube; and
a heat exhaust member coupled to the top of said second tube.

18. The engine of claim 14 further comprising:
a regenerator configured to receive the working fluid and provide a larger surface area of heat transfer.

19. The engine of claim 18 wherein said regenerator is the earth.

20. The engine of claim 18 wherein said regenerator is a porous media.

21. The engine of claim 18 wherein said regenerator is a sintered filter like device.

22. The engine of claim 18 wherein said regenerator is a flame arrestor flow restrictor type device.

23. The engine of claim 14 further comprising:
at least one heater to increase the temperature of the working fluid, said at least one heater is powered by a renewable energy source.

24. The engine of claim 14 further comprising:
at least one refrigeration unit to decrease the temperature of the working fluid, said at least one refrigeration unit is powered by a renewable energy source.

25. The engine of claim 23 wherein the renewable energy source is selected from the group consisting of wind, solar, geothermal, and any combination thereof.

26. The engine of claim 24 wherein the renewable energy source is selected from the group consisting of wind, solar, geothermal, and any combination thereof.

27. The engine of claim 14 wherein the working fluid is selected from the group consisting of helium, hydrogen, nitrogen, air, and any combination thereof.

\* \* \* \* \*